United States Patent [19]

Brookhart et al.

[11] 4,337,492
[45] Jun. 29, 1982

[54] HEAD POSITIONING TRANSDUCER FOR HELICAL SCAN VIDEO REPRODUCER

[75] Inventors: Marshall R. Brookhart, Thousand Oaks; Fredrick J. Hodge; Thomas J. Worden, both of Camarillo, all of Calif.

[73] Assignee: Minnesota Mining and Manufacturing Company, St. Paul, Minn.

[21] Appl. No.: 138,361

[22] Filed: Apr. 8, 1980

[51] Int. Cl.³ .................... G11B 5/52; G11B 21/10
[52] U.S. Cl. .............................. 360/109; 360/77; 360/DIG. 1
[58] Field of Search ............ 360/109, 77, 107, 70, 360/75, DIG. 1

[56] References Cited

U.S. PATENT DOCUMENTS

| | | | |
|---|---|---|---|
| 4,143,405 | 3/1979 | Kubota | 360/10 |
| 4,151,569 | 4/1979 | Hathaway | 360/77 |
| 4,151,570 | 4/1979 | Ravizza | 360/77 |
| 4,152,727 | 5/1979 | Tatsuguchi et al. | 360/77 |

FOREIGN PATENT DOCUMENTS

| | | |
|---|---|---|
| 4784617 | 8/1974 | Japan . |
| 52-43362 | 10/1977 | Japan ............ 360/77 |

Primary Examiner—Alfred H. Eddleman
Attorney, Agent, or Firm—Cruzan Alexander; Donald M. Sell; William B. Barte

[57] ABSTRACT

A head positioning transducer is disclosed for use with a rotating drum assembly for scanning a magnetic tape along a plurality of adjacent helically positioned record tracks, wherein the transducer includes a permanent magnet field assembly and a drive coil positioned adjacent thereto mounted on a cantilevered beam, at one end of which a playback head is mounted, such that a drive current supplied to the coil produces a field which interacts with the field of the magnet, causing a force on the coil and beam, resulting in controlled movement of the head transverse to the record tracks.

9 Claims, 3 Drawing Figures

HEAD POSITIONING TRANSDUCER FOR HELICAL SCAN VIDEO REPRODUCER

BACKGROUND OF THE INVENTION

1. Field of the Invention

This invention relates to magnetic recording and reproducing apparatus, particularly to video reproducers of the helical scanning type in which a magnetic record/playback head is operatively supported within a rotating drum for scanning a magnetic tape along a plurality of adjacent discrete tracks oriented at an angle relative to the lengthwise direction of the tape, and in which special head positioning assemblies are provided to enable repositioning of the head to enable accurate track following.

2. Description of the Prior Art

Helical scan video tape recorders embodying automatic track following features to compensate for non-uniform tape motion, tape stretching, and the like are becoming well known. Such recorders are, for example, disclosed in U.S. Pat. Nos. 4,143,405 (Kubota) and in 4,151,570 (Ravizza)

In addition to such patents wherein track following systems in general are disclosed, it is also becoming known to provide various types of assemblies for enabling a playback head mounted within a rotary scanning drum to be positioned transversely to the path of a magnetic recording medium disposed helically about the drum to enable the head to be moved transversely, thereby enabling automatic track following. For example, in U.S. Pat. No. 4,151,569 (Hathaway) two general types of head positioning assemblies are depicted. The first type utilizes a piezoelectric bender element, while the second type, generally depicted in FIG. 10 of that patent, is based on the use of a leaf formed of magnetically permeable material which is arranged to pivot from a stable support within the drum, rather than bend as provided in the piezoelectric embodiment there depicted. Also mounted on the drum and on both sides of the magnetically permeable leaf are a pair of electromagnets for producing a magnetic field through the leaf and which, when energized, cause the leaf to deflect, thereby moving the head in the desired transverse direction.

Head positioning systems utilizing piezoelectric reed constructions as the transducer for moving the head are known to be subject to variations due to aging and stress, and are therfore not particularly desirable. While the second embodiment depicted in the above-noted patent, based on the use of a magnetically permeable member, avoids certain problems common to piezoelectric problems, that technique is lacking in practicality in that the need for a pivoting member and dual drive coils contributes to head misalignment and azimuth problems.

SUMMARY OF THE INVENTION

In contrast to such systems, the present invention is directed to a head positioning assembly within a helical scanning drum for enabling movement of a record/playback head transverse to diagonal tracks on a magnetic record tape helically wound about at least a portion of the drum, to enable automatic track following. The assembly includes a thin, flexible beam securely mounted on a rotating scanning drum and having a record/playback head mounted on a radially extended extremity thereof. An electromagnetic drive coil is secured to the beam. A permanent magnetic field-providing assembly, also mounted on the drum, interacts with the drive coil such that control signals applied to the coil produce an electromagnetic field which interacts with the field of the magnetic structure and thereby causes deflection of the beam transverse to the direction of the record/playback track.

Particularly, in the present invention, the flexible beam comprises a non-ferromagnetic beam member cantilevered from one end and extending radially outward toward the periphery of the drum, at the radially outward extremity of which a record/playback head is positioned. The drive coil which is secured to the beam at a position between the radial extremity and the cantilevered support end is of homogeneous construction, without internal supports, and is formed of a low mass, thereby enabling the coil to withstand appreciable forces applied transverse to the axis of the coil, such as will be present due to the centrifugal force generated upon rotation of the drum. The permanent magnet field providing assembly includes a gap across which a magnetic field extends, and is positioned relative to the drive coil such that when the beam is positioned at a center nominal position, the coil is centered within the gap. Accordingly, current applied to the coil creates an electromagnetic field which interacts with the field of the magnet assembly and provides a force along the axis of the coil which causes the beam to deflect, thereby providing the transverse head positioning.

Because of the severe environments at which such a head positioning assembly must operate, including centrifugal forces of as much as 1,000 G being generated in a 14 cm diameter drum rotating at 3600 rpm, it is desirable that the drive coil of the present invention comprise a low mass multi-turn, multi-layer coil potted with an epoxy resin capable of withstanding temperatures in excess of 300° Fahrenheit and having high heat conductivity characteristics. Such an epoxy resin desirably also has a coefficient of expansion substantially the same as that of copper wire such that as the coil and resin construction heat up, strains such as may otherwise be introduced in the structure, are prevented. To further minimize the mass of the coil required to generate a requisite driving field, it is also desirable that the magnet structure provided to interact with the field of the drive coil be such as to provide a radially extending field of not less than 3,000 gauss across the gap. Such a construction is desirably provided by a center pole face having a tapered interface proximate to the permanent magnet to thereby focus and linearize the lines of the flux extending across the gap.

DESCRIPTION OF THE PREFERRED EMBODIMENTS

For the purpose of simplification and to facilitate understanding of the present invention, the latter is hereinafter described in detail with respect to an apparatus for reproducing video signals such as in a video tape recorder (VTR). However the problems to which the invention is addressed and the solution of those problems as disclosed herein are not limited to video signal recording and/or reproducing apparatus. Accordingly, it is understood that the invention is similarly applicable to other types of analog and digital recording and reproducing devices.

Figure 1:
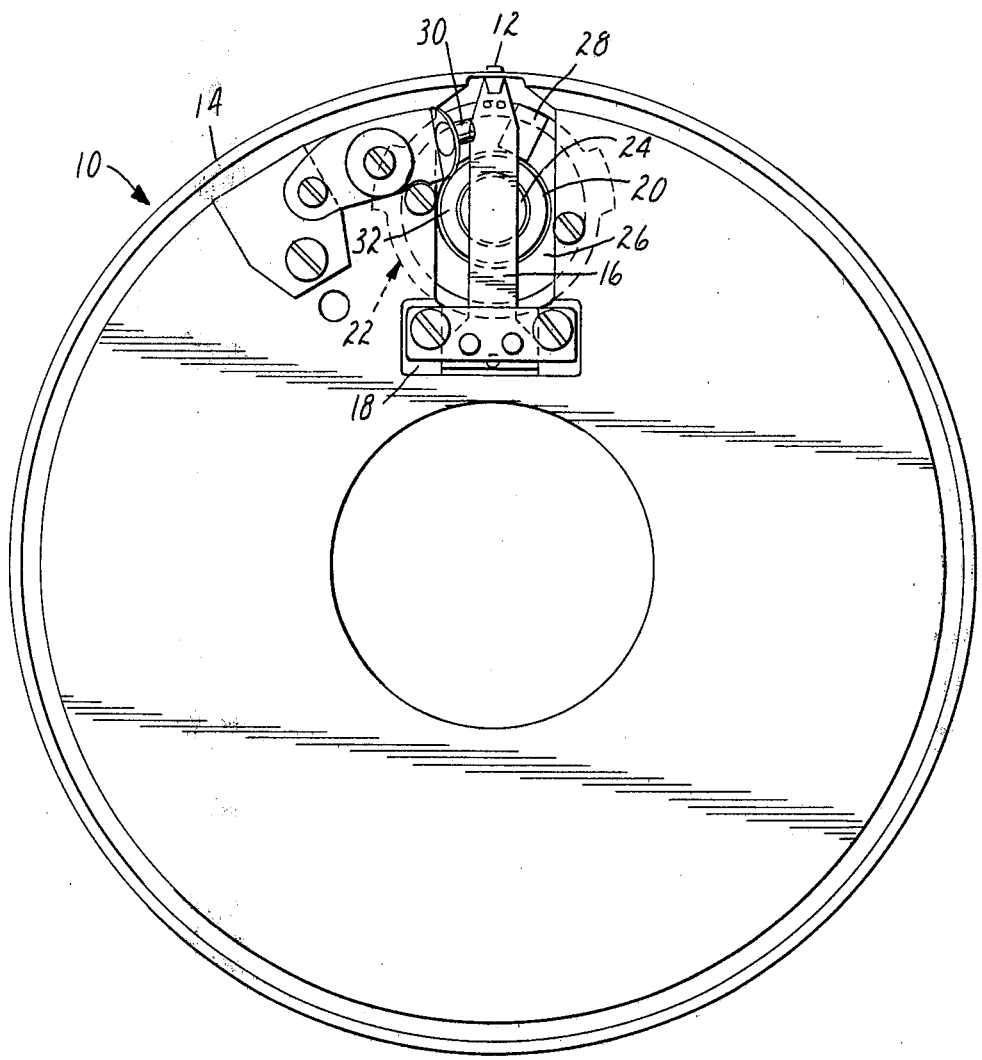
FIG. 1 is a top view of the rotating drum/playback head assembly of the present invention.

Referring first to FIG. 1, it will be seen that a typical rotary head scanning device (scanner) 10, for example, such as used in a helical scan video tape recorder includes a magnetic record/playback head 12 which is mounted within a rotatable drum assembly 14 about the periphery of which a magnetic recording tape is wrapped in a helical path in either an alpha or an omega configuration. In such a recorder, a magnetic tape will be guided by appropriate posts or rollers (not shown) to cause the tape to helically extend about a significant portion of the periphery of the drum 14 such that as the scanner rotates and the tape is moved diagonally across the periphery of the drum, the head 12 scans successive parallel skewed tracks across the tape and generates an electrical signal representative of the information previously recorded on the track. This electrical signal is then fed to signal processing circuitry for processing in a manner as set forth hereinafter.

It is apparent that the extent to which the head 12 can faithfully reproduce the information originally recorded on the successive helical tracks depends upon accurate registration of the head 12 with each of the successive tracks. Tracking problems arise, for example, when the video tapes or the tracks thereon become distorted, such as by temperature or humidity induced dimensional changes, or by movement of the tapes during playback at speeds other than that utilized during the recording process.

Because of such tracking problems, it is desirable to provide a signal indicative of the instantaneous position of the head 12 with respect to successive tracks on the record medium, and to further provide means responsive to such a signal for deflecting the head 12 transversely with respect to the tracks so as to enable centering of the head thereon. More particularly, when perfect tracking between the head 12 and each successive track is not occurring, an electrical correction signal is desirably generated and applied to a head positioning assembly on which the head 12 is mounted. This correction signal causes the assembly to be deflected, thereby moving the head toward the track center to thereby reduce tracking errors. The deflection of the head thus not only enables the head to accurately follow tracks which may be distorted due to physical shrinkage or stretching, or the like, of the record medium, but also to follow tracks regardless of differences between the playback tape speed and the tape speed utilized during the previous recording operation.

Figure 2:
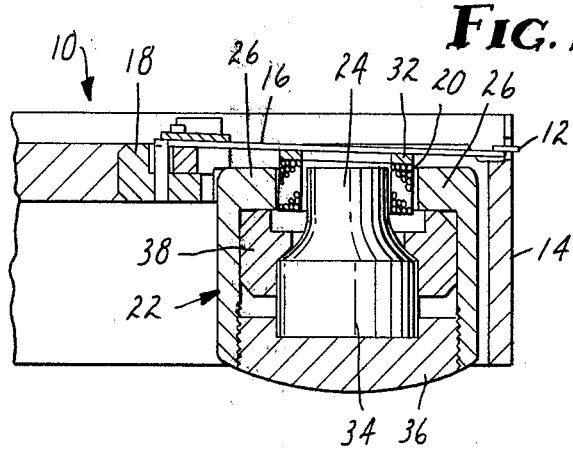
FIG. 2 is a cross-sectional side view of a portion of the drum assembly of FIG. 1, showing the details of the head mounting structure.
Figure 3:
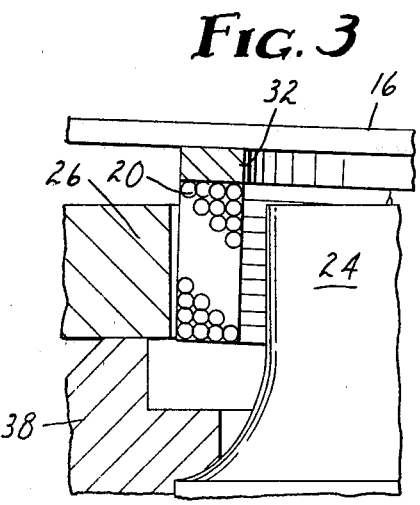
FIG. 3 is an enlarged cross-sectional view of a portion of the drive coil assembly portion in FIG. 2, combined pictorial and block diagram of one embodiment of the system of the present invention.

As shown in FIGS. 1–3 an assembly for positioning or deflecting the playback head 12 includes a flexible beam 16 which is cantilevered outward from a supporting pedestal 18. Also mounted on the cantilevered beam 16 is a drive coil 20, similar in construction to that utilized in a conventional electromagnetic speaker cone and which is secured to the beam 16 by clamps and/or a suitable adhesive. Electrical leads (not shown) coupled to coil 20 are then connected to the stationary portion of the apparatus by means of a suitable slip-ring assembly.

It is further desirable to provide an instantaneous signal indicative of the exact extent to which the head 12 is deflected within the drum 14 in order to enable closed-loop electrical damping of such movement. Accordingly, as is particularly evident in FIG. 1, an electro-optic means is included for sensing the extent of such transverse movement. Such a means includes a LED 28 mounted proximate to the head 12 and a photo-transistor 30. These two members respectively are mounted such that the amount of light produced by the LED 28 is increasingly obscured by transverse positioning of the beam 16 so as to modify the light received by the photo transistor 30 in direct proportion to the extent of transverse deflection of the beam 16. Not shown in FIG. 1, is a small printed circuit amplifier for providing an initial stage of amplification to the signal produced by the photo transistor 30 enabling coupling of the signal generated to the stationary portions of the recorder by means of suitable slip-ring assembly (not shown). It may also be noted that electrical leads for signals produced by the head 12 may similarly be coupled to the non-rotating portions of the apparatus, such as by a suitable rotary transformer (not shown).

As particularly shown in FIG. 2, the drive coil 20 is adapted to interact with a permanent magnet radial flux concentrating pole member 26. Accordingly, an electrical signal in the form of a DC current impressed upon the drive coil 20 will cause the generation of a magnetic field which either opposes or aids the field produced by the permanent magnet structure 22 and thereby creates a driving force on the beam 16 to move the head 12 transverse to the tracks of the record media over a given range.

As further shown in FIG. 2, the beam 16 is mounted on a supporting pedestal 18, which can be an integral machined surface of the drum 14. The pedestal is preferably a separate structure, having an upper surface on which the beam is mounted, machined at a slight angle with respect to the plane of the drum 14 (and magnet assembly 22) such that when the beam 16 is secured thereto and the structure secured to the drum, the coil 20 is slightly "cocked" within the gap when the drum is stationary. During rotation of the drum, the resultant centrifugal force acting on the combined mass of the coil and beam assembly causes the beam to slightly deflect, thereby moving the coil into a center or nominal position within the gap. The specific mounting means utilized in conjunction with the pedestal 68 is critical only insofar as it must be recognized that the beam and coil assembly is subjected to radial forces of as much as 1,000 "G's" at the outer extremity of the beam during drum rotation. Further, the positioning of the head 12 is extremely critical and must be reproducibly and controllably positioned a given transverse distance in response to a given drive current applied to the coil 20. Accordingly, the beam must be securely mounted on the pedestal and accurately indexed to prevent any angular or radial motion which could allow the coil to become off-centered within the gap between the center pole piece 24 and outer pole piece 26, or allow the head 12 to move outside allowed limits.

As shown in more detail in FIG. 3, the drive coil 20 of the head positioning assembly is secured to the beam 16 by means of an annular aluminum ring 32. In a particularly desirable embodiment, the assembly of the coil 20 and ring 32 is desirably provided as a single integral unit in order to enhance the mechanical integrity. The coil 20, preferably having between 50 to 200 turns, and in a particular construction, 100 turns, is wound wet with a special epoxy on a temporary bobbin support. In so doing, enamel insulated copper magnet wire is dipped in an uncured high temperature heat conductive epoxy, wound upon the bobbin and fitted onto the aluminum ring. The epoxy is thereafter cured, to result in an extremely rugged homogeneous structure. After curing, the bobbin is removed so as to minimize the total weight of the resultant assembly. A particularly desirable material for use in the coil assembly is a high temperature epoxy resin manufactured by Emmons-Cummings, Inc., Los Angeles, Calif., such as Type 2762 FT. Such a material has a capability of withstanding sustained temperatures in the range of 500° F. and is further more highly heat conductive such that heat generated in the drive coil may be coupled through the aluminum ring 32 and beam 16 so as to subsequently be dissipated within the drum 14. Furthermore, such an epoxy has a temperature coefficient of expansion substantially the same as that of copper wire, and thereby expands at substantially the same rate as the copper wire so as to maintain the structural integrity of the coil during heating and cooling cycles.

In a preferred embodiment, coil 20 may have dimensions of approximately 0.5 inch (12.2 mm) OD and approximately 0.25 inch (6.1 mm) deep, not including the aluminum supporting ring. While the particular electrical characteristics of the coil are not critical inasmuch as the frequency response capabilities of the coil are relatively nominal, such that a wide range of inductances are operative, it is nonetheless desirable to provide a reasonable number of turns within the coil. Since the field produced by the coil is determined by the product of the number of turns times the current, this allows the drive current required within the coil to provide a given field to be kept within reasonable limits, thereby minimizing the required current carrying capability of the slip-ring assembly (not shown) used for coupling the drive current to the rotating drum assembly.

The permanent magnet assembly 22 is further shown in FIGS. 2 and 3 to incude a high intensity permanent magnet 34 such as may preferably be formed from samarium cobalt. The magnet 34 is magnetically coupled to a central pole member 24, while the flux return path is provided by means of a keeper assembly including a bottom member 36 and radial pole assembly 26, which members may be threaded together as shown in FIG. 2 or similarly assembled. A non-magnetic positioning ring 38 is similarly desirably provided such that when the lower member 36 is threaded into the pole assembly 26, the permanent magnet 34 and central pole member 24 are locked in place in an axially centered position to insure magnetic continuity under high centrifugal forces. Such an assembly is desirably capable of providing a field intensity across the gap in excess of 3,000 gauss. In a particular construction (not shown) utilizing such a samarium cobalt permanent magnet, a cobalt-iron alloy for the central pole member 24 and a combination of an annular samarium-cobalt permanent magnet and soft iron outer keeper for the radial pole assembly 26, field intensities across the gap in the range of 5,000 to 6,000 gauss may readily be provided.

In a particularly preferred construction, the outside diameter of such a magnetic assembly may be in the range of 1.03 inch (2.62 cm) outer diameter by approximately 0.875 inch (2.22 cm) deep. The central pole member preferably has a diameter of approximately 0.375 inch (0.95 cm), and has a gap of approximately 0.090 inch (2.29 mm) between the central pole phase and the outer radial pole member.

Finally, the beam 16 is desirably formed of a non-magnetic stainless steel such as Type 302, which is etched out of a physically flat, annealed sheet to thereby minimize any stresses and deformations in the beam as may otherwise result or other "spring-like" metals having a Young's Modulus of not less than $28 \times 10^6$ psi. While the thickness and length-to-width ratios of the beam are relatively non-critical, it should be noted that the beam and coil assembly should be selected so as to provide a natural resonance frequency in excess of 400 hertz, and particularly a resonance in the range of 450 to 500 hertz. Such a frequency is approximately one-half the video signal retrace time, and thereby enables the beam and assembly to accurately reposition the head during retrace intervals. In a particular construction, such a beam may be approximately 1.375 inches (3.49 cm) long, have a width of approximately 0.25 inch (0.635 cm), and have a thickness of 0.030 inch (0.76 mm).

The manner by which the signals provided by the respective members within the rotating drum assembly 14 are processed to control the relative head position is set forth in the copending patent application No. 138,436 by Bradford et al, filed on the same day herewith. As there set forth, signals derived from the head 12 are coupled to a track centering network which responds to relative amplitudes of the signals from the head to thereby generate a closed loop feedback signal which is coupled to the drive coil to cause the beam to deflect in a direction so as to maximize the detected signal. Likewise, that application discloses details for providing head positioning signals to the drive coil as appropriate to compensate for varying tape speeds and directions.

The above-described improvements have been combined in a new video-helical scan reproducer. However, the improvements may be used independently of one another and in various applications other than helical scan reproducers. Moreover, many alternatives, modifications, and variations in the specific embodiments described herein will be apparent to those skilled in the art. Accordingly, the present invention is intended to include all such alternatives, modifications, and variations which fall within the spirit and scope of the invention as defined by the appendent claims and equivalents thereof. Various features of the invention are set forth in the following claims.

We claim:

1. A head positioning assembly for enabling movement of a record/playback head within a helical scanning drum transverse to diagonal tracks on a magnetic record tape helically wound about at least a portion of the drum to enable automatic track following, said assembly comprising:
   (a) a cantilevered deflectable non-ferromagnetic beam member supported at one end within said drum and extending radially outward toward the periphery of said drum and having said head secured to the radially extended extremity thereof,
   (b) a drive coil secured to said beam at a position between said radial extremity and the cantilevered support thereof, said coil being of homogeneous construction without internal supports and of low mass to enable said coil to withstand appreciable forces transverse to the axis thereof, and (c) a permanent magnet field providing assembly mounted on the drum and including a gap across which a magnetic field extends, positioned relative to the drive coil such that at a center nominal position of said beam the coil is centered within the gap, whereby current applied to said coil creates an electromagnetic field which interacts with the field of the magnet assembly to provide a force along the axis of the coil which causes the beam to deflect, thereby providing said transverse head positioning.

2. A head positioning assembly according to claim 1, wherein said permanent magnet assembly comprises a permanent magnet core and center and outer concentric pole faces providing a restricted area annular gap therebetween.

3. A head positioning assembly according to claim 2 wherein the center pole face is provided with tapered interface proximate to the permanent magnet to thereby focus and linearize the lines of flux extending across the gap.

4. A head positioning assembly according to claim 3, wherein a radially extending field of not less than 3,000 gauss is provided across the gap.

5. A head positioning assembly according to claim 1, wherein said drive coil comprises a multiturn, multilayer coil potted with an epoxy resin capable of withstanding temperature in excess of 300° F. and having high heat-conductivity characteristics.

6. A head positioning assembly according to claim 5 wherein said coil contains between 50–200 turns.

7. A head positioning assembly according to claim 1, wherein said beam comprises a substantially stress-free ribbon of non-magnetic metal having a Young's Modulus of not less than $28 \times 10^6$ psi.

8. A head positioning assembly according to claim 7, wherein the combined assembly of the beam and coil has a resonant frequency in excess of 400 hz.

9. A head positioning assembly according to claim 1, wherein said beam is mounted on said drum at an angle with respect to plane of the drum, such that the angle offsets the deflection resulting from centrifual force arising during rotation of the drum acting on the combined mass of the beam and coil to enable the coil to be centered within the gap at said nominal position during drum rotation.

* * * * *